United States Patent
Kim et al.

(10) Patent No.: US 8,478,313 B2
(45) Date of Patent: Jul. 2, 2013

(54) MESSAGE SERVICE METHOD AND MESSAGE SERVICE SYSTEM

(75) Inventors: Jeong Hwan Kim, Daejeon (KR); Sang Ki Kim, Daejeon (KR); Byung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 369 days.

(21) Appl. No.: 12/744,203

(22) PCT Filed: Oct. 10, 2008

(86) PCT No.: PCT/KR2008/006001
§ 371 (c)(1),
(2), (4) Date: May 21, 2010

(87) PCT Pub. No.: WO2009/066871
PCT Pub. Date: May 28, 2009

(65) Prior Publication Data
US 2010/0248758 A1 Sep. 30, 2010

(30) Foreign Application Priority Data
Nov. 21, 2007 (KR) .................. 10-2007-0119189

(51) Int. Cl.
*H04W 4/14* (2009.01)
(52) U.S. Cl.
USPC ............. 455/466; 455/414.4; 379/88.13
(58) Field of Classification Search
USPC ............ 455/466, 414.4; 709/206; 379/88.13
See application file for complete search history.

(56) References Cited

U.S. PATENT DOCUMENTS

| | | | | |
|---|---|---|---|---|
| 6,539,425 | B1* | 3/2003 | Stevens et al. | 709/220 |
| 6,895,251 | B2* | 5/2005 | Soh et al. | 455/466 |
| 7,277,951 | B2 | 10/2007 | Marriott et al. | |
| 7,738,833 | B2* | 6/2010 | Bettis et al. | 455/3.04 |
| 7,873,708 | B2* | 1/2011 | Durand et al. | 709/219 |
| 7,962,126 | B2* | 6/2011 | Haung et al. | 455/412.2 |
| 7,983,245 | B2* | 7/2011 | Eichler et al. | 370/352 |
| 2004/0073928 | A1* | 4/2004 | Alakoski et al. | 725/62 |
| 2004/0148357 | A1* | 7/2004 | Corrigan et al. | 709/206 |
| 2004/0187007 | A1* | 9/2004 | Vincent et al. | 713/176 |
| 2004/0266412 | A1* | 12/2004 | Maes et al. | 455/414.4 |
| 2005/0141522 | A1* | 6/2005 | Kadar et al. | 370/396 |
| 2005/0186974 | A1* | 8/2005 | Cai | 455/466 |
| 2005/0250520 | A1* | 11/2005 | Johnson et al. | 455/466 |

(Continued)

FOREIGN PATENT DOCUMENTS

| KR | 10-0408357 | 11/2003 |
|---|---|---|
| KR | 1020030096654 | 12/2003 |

(Continued)

*Primary Examiner* — Kamran Afshar
*Assistant Examiner* — Mong-Thuy Tran
(74) *Attorney, Agent, or Firm* — Nelson Mullins Riley & Scarborough LLP; EuiHoon Lee, Esq.

(57) ABSTRACT

The present invention relates to a message service method and a message service system. The message service method receives a message and a message transmission request from an open service application user and transmits the message to an appropriate transmission infrastructure such that the message arrives at a destination terminal. To achieve this, the message service system includes an open service application server which sends the message and the message transmission request, an open service gateway which reconstructs the message as one of a short message, a WAP Push message and a multimedia message through message analysis, and transmission infrastructures which transmits messages.

18 Claims, 4 Drawing Sheets

U.S. PATENT DOCUMENTS

| | | | |
|---|---|---|---|
| 2006/0007957 A1* | 1/2006 | Pihlajamaki et al. | 370/471 |
| 2006/0056419 A1* | 3/2006 | Eichler et al. | 370/395.52 |
| 2006/0123226 A1* | 6/2006 | Kumar et al. | 713/154 |
| 2006/0123425 A1* | 6/2006 | Ramarao et al. | 719/313 |
| 2006/0123477 A1* | 6/2006 | Raghavan et al. | 726/22 |
| 2006/0194595 A1* | 8/2006 | Myllynen et al. | 455/466 |
| 2006/0240851 A1* | 10/2006 | Washburn | 455/466 |
| 2007/0005766 A1* | 1/2007 | Singhal et al. | 709/225 |
| 2007/0005801 A1* | 1/2007 | Kumar et al. | 709/238 |
| 2007/0070979 A1* | 3/2007 | Kim et al. | 370/352 |
| 2007/0077922 A1* | 4/2007 | Kim et al. | 455/414.2 |
| 2007/0133761 A1 | 6/2007 | Rhee et al. | |
| 2007/0174401 A1 | 7/2007 | Chu et al. | |
| 2007/0180037 A1* | 8/2007 | Cheng et al. | 709/206 |
| 2007/0218932 A1* | 9/2007 | Sung et al. | 455/518 |
| 2007/0223491 A1* | 9/2007 | Baek et al. | 370/395.21 |
| 2007/0239737 A1* | 10/2007 | Dudley et al. | 707/10 |
| 2007/0239953 A1* | 10/2007 | Savagaonkar et al. | 711/163 |
| 2007/0249328 A1* | 10/2007 | Jung et al. | 455/414.1 |
| 2007/0263822 A1* | 11/2007 | Chang et al. | 379/202.01 |
| 2008/0046524 A1* | 2/2008 | Jerding et al. | 709/206 |
| 2008/0126541 A1* | 5/2008 | Rosenberg et al. | 709/225 |
| 2008/0137593 A1* | 6/2008 | Laudermilch et al. | 370/328 |
| 2008/0176587 A1* | 7/2008 | Glazer et al. | 455/466 |
| 2008/0200190 A1* | 8/2008 | Malcolm et al. | 455/466 |
| 2008/0228851 A1* | 9/2008 | Angelov et al. | 709/201 |
| 2008/0228860 A1* | 9/2008 | Angelov | 709/202 |
| 2008/0292101 A1* | 11/2008 | Macchi | 380/270 |
| 2008/0318600 A1* | 12/2008 | Timmons et al. | 455/466 |
| 2009/0029724 A1* | 1/2009 | Hardy et al. | 455/466 |
| 2009/0083381 A1* | 3/2009 | Mully | 709/206 |
| 2009/0086725 A1* | 4/2009 | Lai et al. | 370/352 |
| 2009/0156242 A1* | 6/2009 | Wang | 455/466 |
| 2009/0221307 A1* | 9/2009 | Wolak et al. | 455/466 |
| 2010/0041380 A1* | 2/2010 | Hewes et al. | 455/414.4 |
| 2010/0113074 A1* | 5/2010 | Sheppard | 455/466 |
| 2010/0197329 A1* | 8/2010 | Claudatos et al. | 455/466 |
| 2010/0205309 A1* | 8/2010 | Skog et al. | 709/227 |
| 2012/0095831 A1* | 4/2012 | Aaltonen et al. | 705/14.52 |

FOREIGN PATENT DOCUMENTS

| | | |
|---|---|---|
| KR | 1020040020623 | 3/2004 |
| KR | 1020060066372 | 6/2006 |
| KR | 1020070062693 | 6/2007 |

\* cited by examiner

MESSAGE SERVICE METHOD AND MESSAGE SERVICE SYSTEM

RELATED APPLICATIONS

This application is a 35 U.S.C. §371 national stage filing of PCT Application No. PCT/KR2008/006001 filed on Oct. 10, 2008, which claims priority to, and the benefit of, Korean Patent Application No. 10-2007-0119189 filed on Nov. 21, 2007. The contents of the aforementioned applications are hereby incorporated by reference.

TECHNICAL FIELD

The present invention relates to a message service method and a message service system for classifying messages into a short message, a WAP Push message and a multimedia message, transmitting and processing the messages in a network according to the content of a message transmission request from an open service application server and a service application's policy under an open service environment.

The present invention is derived from researches performed as a part of IT new growth power core technology development project of Ministry of Information and Communication and Institute for Information Technology Advancement [Project management number: 2005-S-056-03, Project name: Open API and Service platform technology development].

BACKGROUND ART

Open service technology is a technology of defining abstract application program interfaces (APIs) for fixed/mobile telecommunication network capabilities such as a fixed/mobile call control function, short messaging and multimedia messaging transmitting/receiving functions and acquiring of a subscriber's location information to provide an environment in which a third party service provider can easily develop and rapidly deploy various application services by using those APIs without taking care of the detailed procedure and processing happened in the communication network.

An open service gateway is a necessary element for a next generation open network, which provides services using standardized open APIs irrespective of the network type such as fixed network, mobile network and IP network. The open service gateway abstracts various network capabilities, such as call control, call status monitoring, charging, location information and presence information and so on and provides the abstracted functions in the form of a service capability feature(SCF) that exposes a service interface existing in the open service gateway. Although communication network service providing systems that have been developed up to now are dependent on a specific single network, the open service gateway system provides communication services through the same open API in various networks.

Open API technology is established by Parlay Group and published as a standard such as 3GP, ETSI, 3GPP2 through activity of Joint Working Group (JWG) with members of 3GPP that is a standard group of third generation mobile communications.

Capability of communication network which can be used through the open API includes call processing, transmitting/receiving a short message/multimedia message, providing position information, charging and account management, presence and availability information and is continuously extended.

Multimedia messaging API defined in 3GPP TS 29.199-01 is originally designed to send any kind of multimedia messages to desired destination terminal by simply invoking the multimedia message API like sendMessage( )irrespective of the different message transportation infrastructures like SMSC(Short Message Service Center), MMRS(Multimedia Message Relay Server) or other message transportation system. So, the standard specification does not mandate the only use of MMS infrastructure.

However, Most of the existing systems which implemented the Multimedia messaging API translate the incoming message request into a message in the form of a MMS message The reason why the systems do not use different infrastructures depending on characteristics and environments of common carriers and usually operate in connection with the MMS infrastructure is that short messaging web service standard 3GPP TS 29. 199-04 is separately defined in the case of short messaging.

In general, MMS means a third generation multimedia messaging service which can construct a new value-added multimedia message using individual contents such as text, images, video clips or music and transmit the new value-added multimedia message through various services.

However, the original purpose of the multimedia messaging API is to transmit the requested messages from application server to a destination terminal by providing and using the same interface irrespective of whether the message can be translated into SMS or MMS.

Furthermore, many SMS infrastructures have been previously installed, and thus expenses can be reduced when the SMS infrastructures are used. Moreover, when a destination terminal is a short messaging dedicated terminal, it is required to transmit messages to the destination terminal using the SMS infrastructure.

DISCLOSURE OF INVENTION

Technical Problem

An object of the present invention is to provide a message service method and a message service system for processing received message transmission requests through the same interface cost-optimally and transmitting a short message when it is required to transmit the short message.

Technical Solution

To accomplish the object of the present invention, there is provided a message service method comprising the steps of receiving a message and a message transmission request, extracting message elements including the contents and information of the message, and selecting one of a plurality of transmission infrastructures which transmit messages according to the message elements and requesting the selected transmission infrastructure to transmit the message.

To accomplish the object of the present invention, there is also provided a message service system comprising an open service application server sending a message and a message transmission request, a plurality of transmission infrastructures transmitting messages, and an open service gateway receiving the message and the message transmission request, selecting one of the plurality of transmission infrastructures according to message elements including the contents and information of the message and requesting the selected transmission infrastructure to transmit the message.

ADVANTAGEOUS EFFECTS

According to the present invention, message transmission requests are transmitted using the same interface irrespective of the message type, and thus flexibility can be guaranteed when service applications are generated or distributed. Furthermore, the present invention supports a specific service application such that the specific service application appropriately selects a desired policy. A third party service provider can be provided with convenience and cost-optimized service by appropriately selecting a message transmission infrastructure. Common carriers can use previously constructed various message transmission infrastructures efficiently.

BEST MODE FOR CARRYING OUT THE INVENTION

Figure 1:
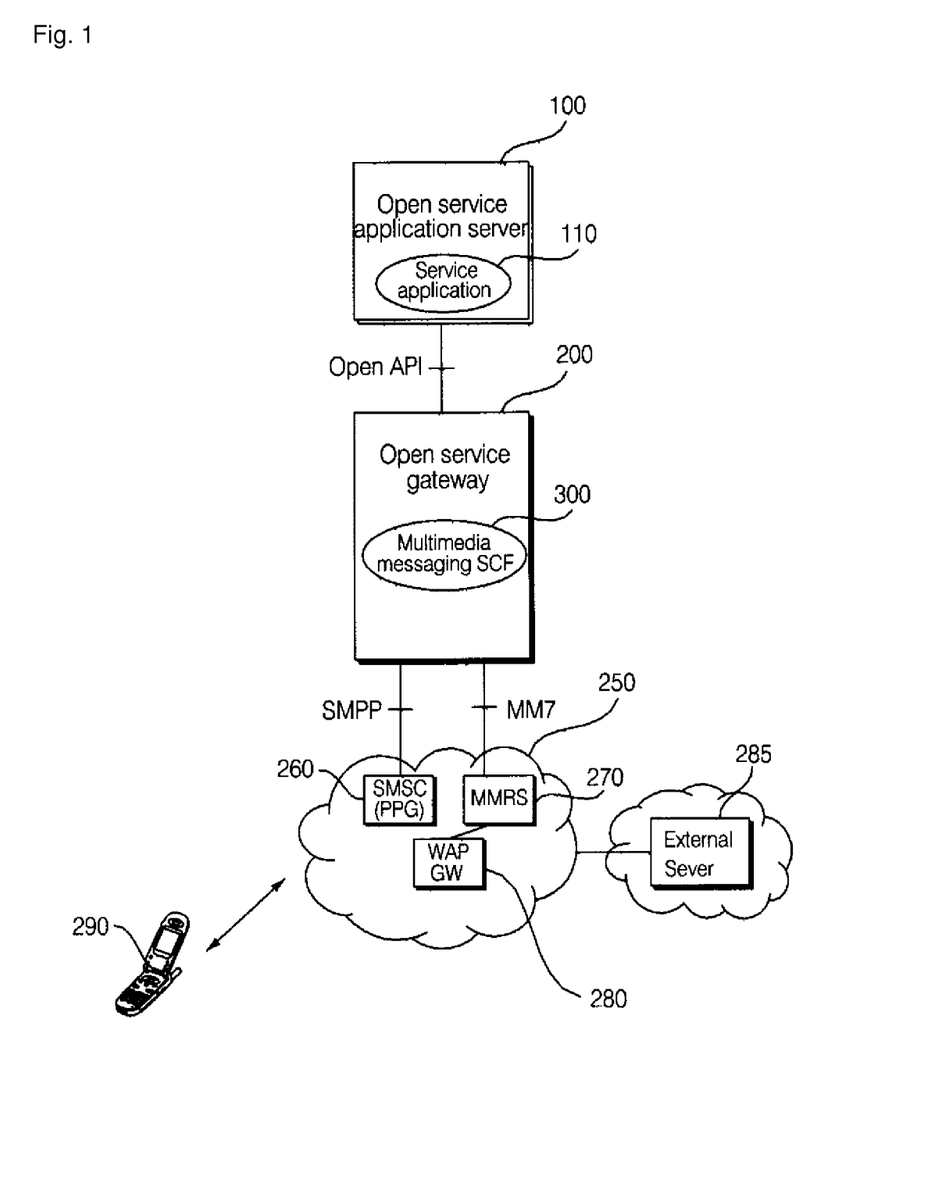
FIG. 1 is a block diagram of a system to which a message service method according to an embodiment of the present invention is applied.

FIG. 1 is a block diagram of a system to which a message service method according to an embodiment of the present invention is applied. Referring to FIG. 1, an open service structure includes an open service application server 100, an open service gateway 200, and a plurality of transmission infrastructures 260 and 270.

The open service application server 100 is a device including various service applications using an open API and it performs and processes a corresponding service. Different services can be constructed according to the purpose of service applications. In the current embodiment, a service application 110 using messaging capability calls a messaging API during a process of carrying out an operation of service application and transmits a specific multimedia message and a message transmission request to the open service gateway 200.

The open service gateway 200 provides a safe method of accessing an open API that the service application 110 wants to use to call the open API. The open service gateway 200 receives the message and message transmission request from the service application 110 and transmits the message and message transmission request to the transmission infrastructures 260 and 270.

The open service gateway 200 includes various service capability features (SCFs) which perform a protocol conversion function for infrastructures in a network in order to internally connect a corresponding API to a related transmission infrastructure. In the current embodiment, a multimedia messaging SCF (referred to as 'MM SCF' hereinafter), which processes requests for transmitting texts, images and video clips, processes message transmission.

The MM SCF 300 is connected to the plurality of transmission infrastructures 260 and 270 through various protocols. According to the contents of standard 3GPP TS 29.199-05, the multimedia messaging web service standard prescribes an interface capable of transmitting and receiving multimedia messages including texts, images and video clips and defines an abstracted API such that the API is mapped to SMS, enhanced messaging service (EMS), MMS, instant messaging (IM) and E-mail through transmission to a underlying network.

For example, the MM SCF 300 constructs connections with the short message service center (SMSC) 260 and the multimedia message relay server (MMRS) 270 through short message peer to peer (SMPP) protocol and MM7 protocol, respectively.

The transmission infrastructures 250 receive a message transmission request from the open service gateway 200 and transmit the message transmission request to a destination terminal 290. The transmission infrastructures may include an SMS infrastructure and an MMS infrastructure.

The SMSC 260 which is a core entity of the SMS infrastructure stores an SMS message or a wireless application protocol (WAP) push message and transmits/receives the message to/from the destination terminal 290.

The MMRS 270 which is a core entity of the MMS infrastructure stores an MMS message and transmits/receives the message to/from the destination terminal 290.

The SMSC 260 or the MMRS 270 transmits a message from a network to the destination terminal 290 and processes the message according to the procedures specified in the related standards 3GPP TS 23. 040 (Technical realization of Short Message Service (SMS)) and 3GPP TS 23.140 (Multimedia Messaging Service (MMS); Functional Description; Stage 2). The detailed embodiment is described based on these standards.

The WAP Push message contains a uniform resource locator (URL) in addition to a text such that a user can further access a corresponding web site to receive images, music and video clips. after the message has transmitted to the terminal of the user.

WAP Push message has a message content type and contains a actual URL for further user access and retrieval.

A recipient of the WAP Push message can access an external server 285 via a WAP GW 280 to access corresponding resources (URL) to be connected with the corresponding resources. The WAP Push message can be transmitted to a terminal through a push proxy gateway (PPG). In most cases, SMS is currently used as a transmission channel for loading the WAP Push message. So, the SMSC 260 also functions as the PPG.

When the content type is the WAP Push message, the related parameter setup is reconstructed as a WAP Push message in order to use the SMPP protocol.

Figure 2:
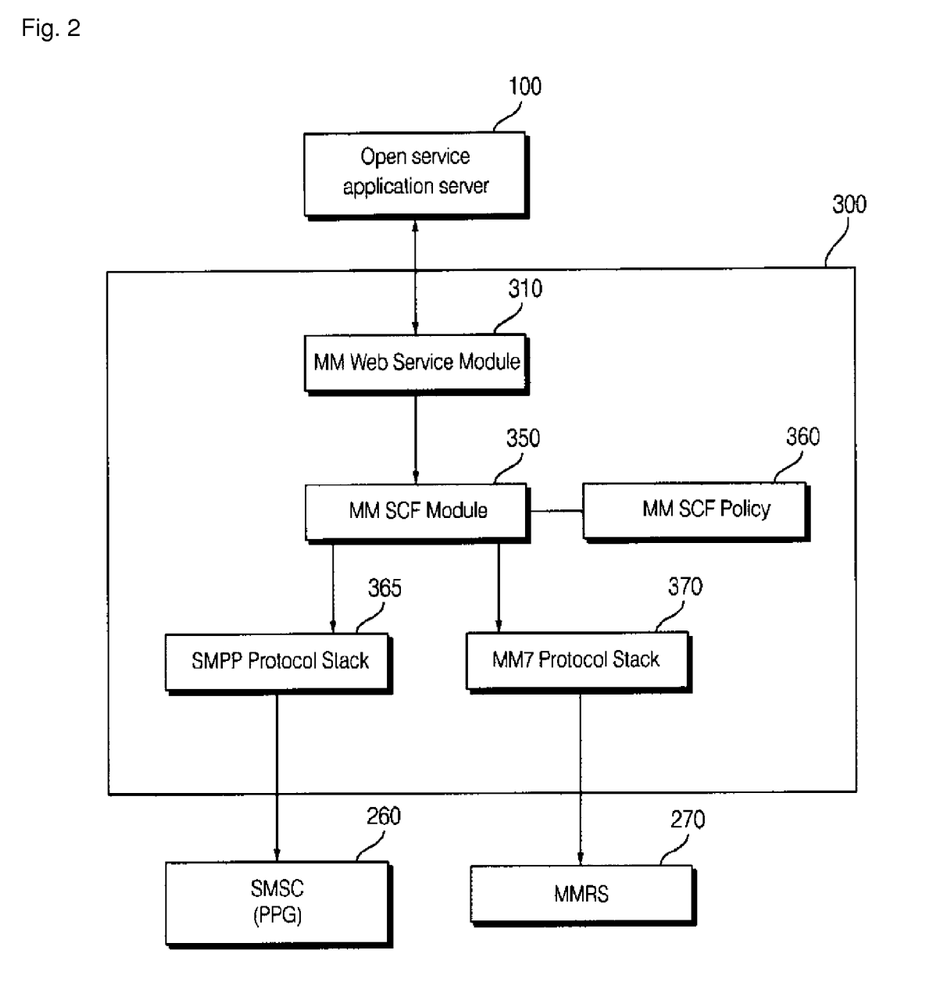
FIG. 2 is a block diagram illustrating a detailed configuration of an MM SCF illustrated in FIG. 1.

FIG. 2 is a block diagram illustrating a detailed configuration of the MM SCF illustrated in FIG. 1. Referring to FIG. 2, the MM SCF 300 includes a MM web service module 310, an MM SCF module 350, an MM SCF policy 360, an SMPP protocol stack 365, and an MM7 protocol stack 370.

The MM web service module 310 receives a web service request including a message to be sent to terminal and a message transmission request from the open service application server 100. The message and the message transmission request are transmitted in the form of a SOAP message which is a standard communication protocol used for web services. The MM web service module 310 receives the SOAP message and transfers the SOAP message to the MM SCF module 350 through internal communication.

The MM SCF module 350 controls parts related to analysis and internal storing of a message, selection and processing of a proper transmission infrastructure.

The MM SCF module 350 analyzes the message to extract message elements such as the format, contents and information of the message. The MM SCF module 350 reconstructs the message by evaluating the structure of the message elements, a predefined transmission infrastructure setup value set by the open service application server 100, and the capability of the destination terminal. The reconstructed message could be one of a SMS message, a WAP Push message and a MMS message.

The MM SCF module 350 selects a transmission infrastructure which will process the reconstructed message. The MM SCF module 350 transmits the reconstructed message to one of the SMPP protocol stack 365 and the MM7 protocol stack 370 according to the selected transmission infrastructure.

The SMPP protocol stack 365 and the MM7 protocol stack 370 connect the MM SCF module 350 with the transmission infrastructure. The SMPP protocol stack 365 and the MM7 protocol stack 370 respectively support protocols for interoperating with the SMSC 260 and the MMRS 270.

The SMPP or MM7 protocol is defined by the standard 3GPP TS 23.040, 3GPP TS 23.140 and representative of all the protocols capable of operating in connection with the SMS infrastructure and the MMS infrastructure.

The MM SCF policy 360 is a database which stores a configurable value set by the open service application server 110 for the operation of the MM SCF 300. The set value includes the aforementioned transmission infrastructure setup value.

Figure 3:
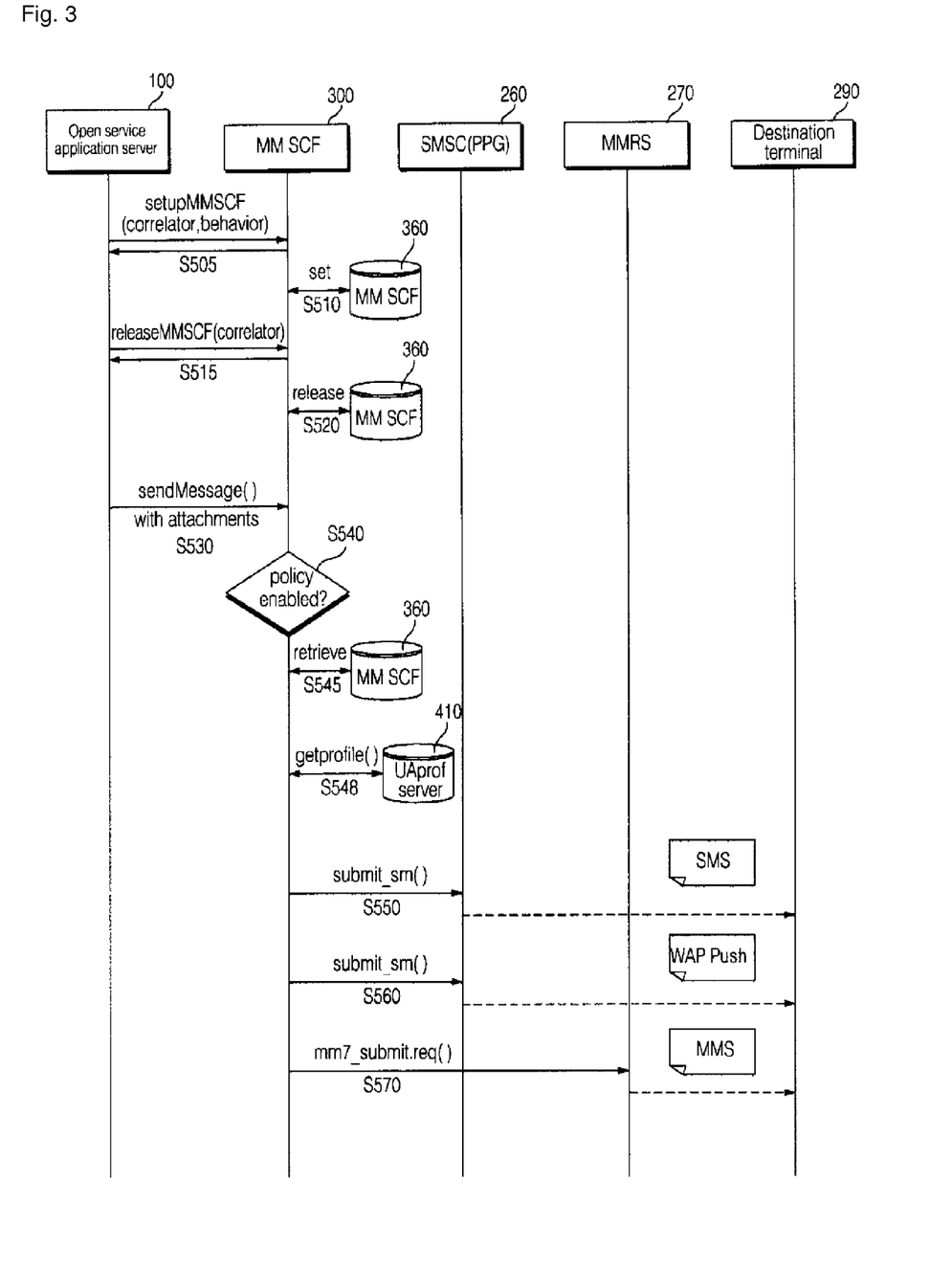
FIG. 3 illustrates a signal flow of the message service method according to an embodiment of the present invention.

FIG. 3 illustrates a signal flow of the message service method according to an embodiment of the present invention.

Referring to FIG. 3, the open service application server 100 can set up and release a policy such that the MM SCF 300 can operate in a manner that the open service application server 100 desires.

The open service application server 100 can set up a policy through a message 'setupMMSCF(correlator, behavior)' in operation S510. Here, 'correlator' is a parameter used to identify the specific service application 110 and 'behavior' corresponds to setup value. The 'behavior' can include 'Default', 'All', 'MMSonly' and 'SMSonly'. 'Default' represents that the open service application server 200 conforms to the setup currently supported by the MM SCF 300, and 'All' sets all message classifications which can be supported by the MM SCF 100. Furthermore, 'MMSonly' or 'SMSonly' sets message transmission using only a specific infrastructure such as MMS infrastructure or SMS infrastructure.

The open service application server 100 can release the policy through a message 'releaseMMSCF(correlator)' in operation S520. Here, 'correlator' is a parameter used to identify the service application 110. When the setup is released, the MM SCF 300 operates according to the policy set to 'default'.

A setup value of the policy is stored in the MM SCF policy 360.

The message transmission request of the open service application server 100 is transmitted as an SOAP message. Details of a message, such as a message name, a parameter name and the contents of the message, are described in a 'web service description language (WSDL)' for the message transmission request. The message transmission request can be represented in the following SOAP message in operation S530.

SendMessage(Addresses, SenderAddress, Subject, Priority, Charging, ReceiptRequest) with Attachment 'SendMessage( )' is the name of an operation that requests multimedia message transmission. 'Addresses' represent the address or addresses of a destination terminal. 'SenderAddress' represents the address of a sender. 'Subject' represents the subject of a message. 'Priority' is a parameter for representing the priority of a requested message. 'Charging' is a parameter including information on charging agreed between a telecommunication service provider and a $3^{rd}$ party service provider. 'ReceiptRequest' is a parameter used for an application to receive notification for receipt confirmation. The contents of the message correspond to 'attachment' of the SOAP message.

'Attachment' is a container capable of containing various contents such as text files, images, video clips, SMIL files, link information (URL) on contents and so on.

Accordingly, the open service application server 100 can invoke 'SendMessage( )' web service by properly configuring the parameters and attachment and sending the SOAP message to MM SCF 300.

When message transmission is requested, the MM SCF 300 checks whether there is a policy set up by the open service application server 100 in operation S540 by searching a database of the MM SCF policy 360. When there is a setup value in the database, the MM SCF 300 reads the setup value in operation S545 and processes the message transmission request according to the setup value. The processing operation will be explained later.

The MM SCF 300 can check the terminal capability of the destination terminal to select an appropriate transmission infrastructure. The MM SCF 300 can retrieve a user profile from a server 410 storing the user profile through a message 'getprofile( )' to know the terminal capability.

The MM SCF 300 transmits the reconstructed message through an appropriate operation according to the selected transmission infrastructure. When the reconstructed message corresponds to a short message, the MM SCF 300 converts the short message to a message 'submit_sm( )' through the SMPP protocol stack 365 and transmits the message to the SMSC 260 to request the SMSC 260 to process the message in operation S550. The WAP Push message also uses the message 'submit_sm( )' and a parameter 'DataCoding' and a parameter 'EsmClass' of the 'submit_sm( )' can be appropriately adjusted and used to be suited to the network characteristic of a network provider in operation S560. When the reconstructed message corresponds to a multimedia message, the MM SCF 300 converts the multimedia message to a message 'mm7_submit.req( )' through the MM7 protocol stack 370 and transmits the message 'mm7_submit.req( )' to the MMRS 270 such that the MMRS 270 processes the message.

Figure 4:
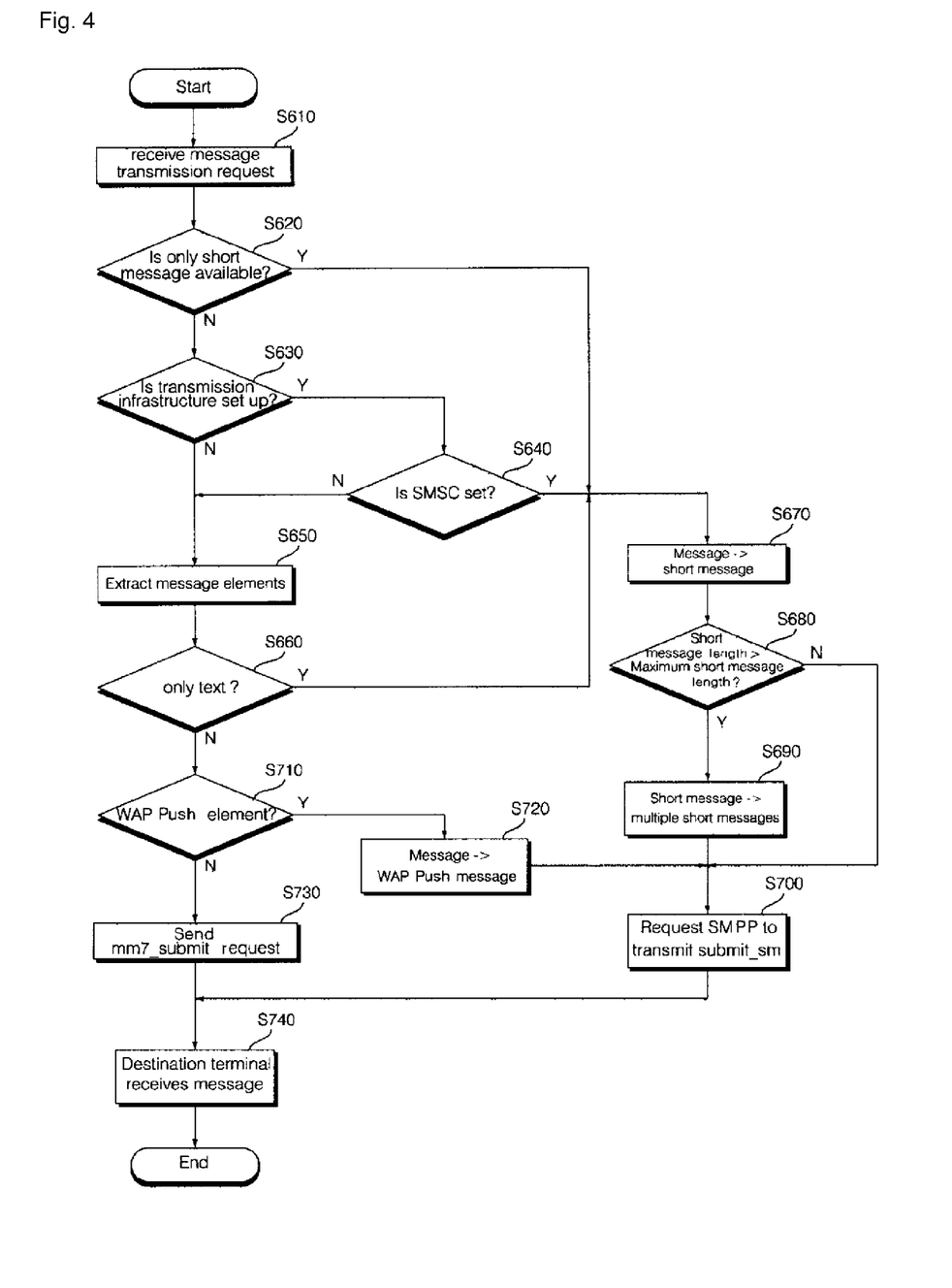
FIG. 4 is a flow chart of the message transmitting method according to an embodiment of the present invention.

FIG. 4 is a flow chart of a message transmitting method according to an embodiment of the present invention.

The MM web service module 310 receives a message and a message transmission request from the open service application server 100 in operation S610 and delivers the message and the message transmission request to the MM SCF module 350 in order to process the message. The message and the message transmission request can use the message 'sendMessage( )' described in operation 5530 illustrated in FIG. 3.

The MM SCF module 350 checks whether the terminal capability of the destination terminal is available only for a short message when the MM SCF module 350 can acquire information on the destination terminal in operation S620. The MM SCF module 350 checks the terminal capability of the destination terminal 290 in order to determine an appropriate infrastructure.

When the terminal capability of the destination terminal 290 is available only for a short message, the destination terminal cannot display a multimedia message to a terminal user even through the destination terminal receives the multimedia message. Policy setup can be made such that a multimedia message shall not be sent to a short message dedicated terminal having no terminal capability for the multimedia message. Furthermore, even a user of the short message dedicated terminal may want to receive information provided by a third party service provider. A mobile telecommunication provider may make a profit by providing short messaging service.

Because the MM SCF module may not access a user profile server, it is an optional case that the MM SCF module 350 determines a transmission infrastructure based on the terminal capability of the destination terminal 290.

The MM SCF module 350 reconstructs the message as a short message when the destination terminal 290 is a terminal capable of receiving only short messages in operation S670. When the MM SCF module 350 receives the message transmission request from the open service application server 100 through the message 'sendMessage( )', the MM SCF module 350 extracts a content type from 'attachment' added to the message 'sendMessage( )', checks that the content type corresponds to a text and reconstructs the message as a short message. A policy for this can be internally set up by the MM SCF 300.

When the destination terminal 290 is a terminal capable of receiving multimedia messages, the MM SCF module 350 checks whether there is a policy set up by the open service application server 100 by searching the MM SCF policy 360 in operation S630. When a policy setup value is set to the SMSC 380, the MM SCF module 350 reconstructs the message as a short message in operation S670.

When the policy setup value is set to the MMRS 390, the MM SCF module 350 extracts message elements such as the format, type and contents of the message in operation S650. When the MM SCF module 350 receives the message transmission request through the 'sendMessage( )' from the open service application server 100, the MM SCF module 350 extracts a content or a content type loaded in 'attachment' added to the 'sendMessage( )'. The MM SCF module 350 selects the SMSC 380 as a transmission infrastructure when the content loaded in the 'attachment' is composed of only texts and reconstructs the message as a short message in operation S670.

A short message has limited text length and requires an inexpensive transmission charge. That is, when a message is composed of only texts, to transmit the message as a short message is more advantageous than to transmit the message as a multimedia message for the third party service provider.

The short message has a limitation on its length. That is, a maximum short message length that can be sent at a time is fixed. The MM SCF module 350 reconstructs the message as a short message or multiple messages according to the message length. To achieve this, the MM SCF module 350 determines whether the length of the short message exceeds the maximum short message length in operation S680. The MM SCF module 350 reconstructs the short message as a plurality of short messages having length that does not exceed the maximum short message length when the short message length exceeds the maximum short message length in operation S690.

When the MM SCF module 350 transmits the short message or the plurality of short messages through the SMPP protocol stack 365, the short message or the short messages are converted to the message 'submit_sm( )' of the SMPP and sent to the SMSC that takes charge of transmitting SMS in operation S850. Then, a response message for the 'submit_sm( )' is received and the operation is finished.

When the message is not composed of only texts, the MM SCF module 350 determines whether the message elements include WAP Push information. When the MM SCF module 350 receives the message transmission request through the message 'sendMessage( )' from the open service application server 100, the MM SCF module 350 confirms whether the content type is 'application/wap.vnd.sl' in operation S710.

The 'application/wap.vnd.sl' is a content type that represents a WAP Push message and includes a URL having actual resources as its contents. A recipient of the WAP Push message can access the external server 285 to access corresponding resources via the WAP GW 280 to be connected with the resources. The WAP Push message is transmitted to the destination terminal through the PPG 260 using a short messaging service method as a transmission channel for loading the WAP Push message. Accordingly, the SMSC also performs the operation of the PPG.

When the content type corresponds to the WAP Push message, the message is reconstructed as a WAP Push message in order to use SMPP in operation S720. The WAP Push message is transmitted to the SMPP protocol stack 365 using the message 'submit_sm( )' of the SMPP in operation S700. The parameters 'DataCoding' and 'EsmClass' of the 'submit_sm( )' message can be appropriately adjusted and used to be suited to the network characteristic of the provider.

When the message is not composed of only texts and does not correspond to a WAP Push message, the message transmission request is processed using the MMS infrastructure. Transmission of MMS message is carried out through the MM7 protocol and the MM SCF module 350 sends the message transmission request using 'mm7_submit( )' in operation S730. The MM7 protocol also transmits the message contents in the form of 'attachment' of SOAP message. Transmission of the message to the MMRS 270 is performed by the MM7 protocol stack 370.

According to the above-described operation, a multimedia message transmission request can be received and a message can be transmitted to a destination terminal in various message forms including a short message, a WAP Push message and a multimedia message according to the previously established application policy, the contents or content type of the message or the terminal capability of the destination terminal.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

Industrial Applicability

When a message transmission request is received, the message transmission request can be cost-optimally processed through the same interface.

The invention claimed is:
1. A message service method comprising:
receiving a message and a message transmission request including a multimedia messaging service capability feature (MM SCF) policy represented by a configurable value set by an open service application server for the operation of an MM SCF;

extracting message elements including the contents and information of the message; and selecting one of a plurality of transmission infrastructures which transmit messages according to the message elements and the MM SCF policy and requesting the selected transmission infrastructure to transmit the message, wherein the open service application server sets up and releases the policy such that the MM SCF operates in a manner that the open service application server desires, wherein the policy includes a parameter used to identify a specific service application, and the configurable value.

2. The message service method according to claim 1, wherein the plurality of transmission infrastructures include a short messaging service (SMS) transmission infrastructure and a multimedia messaging service (MMS) transmission infrastructure.

3. The message service method according to claim 2, wherein when the contents of the member elements include only texts, the message is reconstructed as a short message and the SMS infrastructure is requested to transmit the short message.

4. The message service method according to claim 3, further comprising reconstructing the short message as a plurality of short messages when the length of the short message is greater than a maximum short message length.

5. The message service method according to claim 2, wherein when the information of the message elements includes wireless application protocol (WAP) push information, the message is reconstructed as a WAP Push message such that the SMS infrastructure can use the message and the SMS infrastructure is requested to transmit the WAP Push message.

6. The message service method according to claim 2, wherein the message is reconstructed as a multimedia message and the MMS infrastructure is requested to transmit the multimedia message in cases other than the case where the contents of the message elements include only texts and the information of the message elements includes WAP Push information.

7. The message service method according to claim 2, wherein when there is a transmission infrastructure setup value for selecting one of the plurality of transmission infrastructures, set by an application server which sends the message transmission request, one of the transmission infrastructures is selected according to the transmission infrastructure setup value, the message is reconstructed, and the selected transmission infrastructure is requested to transmit the reconstructed message.

8. The message service method according to claim 7, wherein when the selected transmission infrastructure is an SMS infrastructure, only the text among the contents of the message is extracted and reconstructed as a short message, and the SMS infrastructure is requested to transmit the short message.

9. The message service method according to claim 2, wherein when a destination terminal that receives the message has terminal capability available for only short messages, only the text among the contents of the message is extracted and reconstructed as a short message, and the SMS infrastructure is requested to transmit the short message.

10. A message service system comprising:

an open service application server sending a message and a message transmission request including a multimedia messaging service capability feature (MM SCF) policy represented by a configurable value set by the open service application server for the operation of an MM SCF;

a plurality of transmission infrastructures transmitting messages; and an open service gateway receiving the message and the message transmission request, selecting one of the plurality of transmission infrastructures according to message elements including the contents and information of the message and the MM SCF policy and requesting the selected transmission infrastructure to transmit the message, wherein the open service application server sets up and releases the policy such that the MM SCF operates in a manner that the open service application server desires, wherein the policy includes a parameter used to identify a specific service application, and the configurable value.

11. The message service system according to claim 10, wherein the plurality of transmission infrastructures include an SMS infrastructure and an MMS infrastructure.

12. The message service system according to claim 11, wherein the open service gateway reconstructs the message as a short message and requests the SMS infrastructure to transmit the short message when the contents of the message elements are composed of only text.

13. The message service system according to claim 11, wherein the open service gateway reconstructs the message as a plurality of short messages when the length of the short message exceeds a maximum short message length.

14. The message service system according to claim 11, wherein the open service gateway reconstructs the message as a WAP Push message such that the SMS infrastructure can use the message and requests the SMS infrastructure to transmit the WAP Push message when the information of the message elements includes WAP Push information.

15. The message service system according to claim 11, wherein the open service gateway reconstructs the message as a multimedia message and requests the MMS infrastructure to transmit the multimedia message in cases other than the case where the contents of the message elements include only texts and the information of the message elements includes WAP Push information.

16. The message service system according to claim 11, wherein when there is a transmission infrastructure setup value for selecting one of the plurality of transmission infrastructures, set by an application server which sends the message transmission request, the open service gateway reconstructs the message selects one of the transmission infrastructures according to the transmission infrastructure setup value, reconstructs the message, and requests the selected transmission infrastructure to transmit the reconstructed message.

17. The message service system according to claim 16, wherein the open service gateway extracts only the text among the contents of the message, reconstructs the text as a short message, and requests the SMS infrastructure to transmit the short message when the selected transmission infrastructure is an SMS infrastructure.

18. The message service system according to claim 16, wherein the open service gateway extracts only the text among the contents of the message, reconstructs the text as a short message, and requests the SMS infrastructure to transmit the short message when a destination terminal that receives the message has terminal capability available for only short messages.

* * * * *